United States Patent Office 3,402,247
Patented Sept. 17, 1968

3,402,247
2-CHLORO-5-ISOPROPYLPHENYL N-CHLOROACE-TYL-N-METHYLCARBAMATES AND THEIR USE AS PESTICIDES
Albert H. Haubein, Newark, Del., assignor to Hercules Incorporated, Wilmington, Del., a corporation of Delaware
No Drawing. Filed Feb. 27, 1967, Ser. No. 619,029
10 Claims. (Cl. 424—300)

ABSTRACT OF THE DISCLOSURE

The compounds are of the class of substituted-phenyl carbamates, useful as insecticides. A representative compound is 2-chloro-5-isopropylphenyl N-chloroacetyl-N-methylcarbamate.

---

This invention relates to new compositions of matter. More particularly, it relates to 2 - chloro - 5 - isopropylphenyl N-chloroacetyl-N-methylcarbamates and to their use as pesticides.

It has been found in accordance with the present invention that 2-chloro-5-isopropylphenyl N-chloroacetyl-N-methylcarbamates which conform to the structural formula:

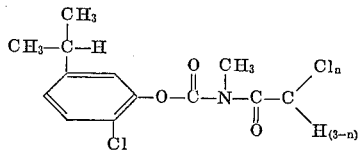

wherein $n$ represents the integer 1, 2 or 3, are new compounds which are highly toxic to insects contacted therewith and are relatively non-toxic to mammals.

These chloroacetyl-N-methylcarbamates may be prepared by effecting reaction between a metal salt of the 2-chloro-5-isopropylphenyl N-methylcarbamate and the appropriate acid chloride (Stefanye et al., J. Am. Chem. Soc., vol. 77 (1955), pages 3663–4). They also may be prepared by reaction of 2-chloro-5-isopropylphenyl chlorocarbonate with the appropriate N-methyl chloroacetamide. Furthermore, the 2-chloro-5-isopropylphenyl N-chloroacetyl-N-methylcarbamate can be prepared from the corresponding N-methylcarbamate and chloroacetic anhydride. The preferred method, however, comprises heating the 2-chloro-5-isopropylphenyl N-methylcarbamate with the corresponding substituted acetyl chloride, in which reaction hydrogen chloride is evolved. An inert solvent of suitable boiling range, such as toluene or xylene, may be utilized, if desired. The temperature of this reaction should be sufficiently high to cause hydrogen chloride formation but not so high as to cause product decomposition. A preferred reaction temperature range is from about 100° C. to about 140° C. Preparation of the subject compounds is illustrated by the following example, all parts and percentages specified being by weight.

Example 1

A mixture of 100 parts 2-chloro-5-isopropylphenyl N-methylcarbamate and 75 parts chloroacetyl chloride was heated at reflux, about 110° C., while slowly sparging with nitrogen. Heating was continued until only a small amount of hydrogen chloride gas was detected in the off-gas. During this time the reaction temperature increased, but was not allowed to exceed 130° C. Excess chloroacetyl chloride was removed by vacuum distillation at 0.5 mm. pressure and a pot temperature which reached 100° C. The dark liquid residue which remained comprised 142 parts 2-chloro-5-isopropylphenyl N-chloroacetyl-N-meth-ylcarbamate, and analyzed 23.9% Cl compared to the theoretical value of 23.3%. By infrared absorption analysis, the product was found also to contain only a small amount (3.5%) of unreacted 2-chloro-5-isopropylphenyl N-methylcarbamate.

The other two compounds of this invention are prepared following the procedure of Example 1. Dichloroacetyl chloride is used in the preparation of 2-chloro-5-isopropylphenyl N - dichloroacetyl - N - methylcarbamate, and trichloroacetyl chloride is utilized in the production of 2 - chloro - 5-isopropylphenyl N-trichloroacetyl-N-methylcarbamate.

Biological tests were carried out using aqueous dispersions of 2-chloro-5-isopropylphenyl N-chloroacetyl-N-methylcarbamate as insecticide sprays to demonstrate that these carbamates are toxic to a variety of undesirable pests. The sprays employed were prepared by adding to solutions comprised of about equal parts of active compound, benzene, and Tween 20 (a sorbitol monolaurate polyoxyethylene derivative), sufficient quantities of distilled water to result in aqueous dispersions of various toxicant concentrations.

The compound 2-chloro-5-isopropylphenyl N-chloroacetyl-N-methylcarbamate was only partially effective when used at a concentration of 1% against Southern armyworms. However, the compound produced high mortality in pea aphids at concentrations of 0.1% and 0.05%. Against houseflies, the compound was moderately effective when applied as a spray containing 0.1% of toxicant. Mexican bean beetles were quite susceptible, concentrations of 0.01% and 0.005% of the compound being capable of producing a very high proportion of fatalities. Also, the compound was active against corn rootworm larvae, providing high mortality at a concentration of 0.01%.

While he preceding information indicates generally the pesticidal utility of the subject carbamates, their most notable utility has been found to be as insecticides for the control of adult mosquitoes. It is in the use of these compounds as adult mosquitocides that the most beneficial embodiment of the present invention resides.

To be classified as a good adult mosquitocide, a compound should not only demonstrate a high degree of initial toxicity, but also toxicity which persists at a relatively undiminished level for a period of days or preferably weeks. The test method used to demonstrate the outstanding initial and residual toxicity of the present chloroacetyl-N-methylcarbamates, and the data obtained, are given in the following example.

Example 2

An aqueous emulsion containing 0.25% of the toxicant to be tested was pipetted into a non-porous unwaxed paper cup in an amount sufficient to cover the surface thereof with either 50 mg. or 25 mg. of toxicant per square foot; which emulsion was spread all over the inner surface until dry. The treated cups were allowed to stand open for one to three days at ambient conditions of about 78° C. to 50% relative humidity. Ten female, unfed, adult mosquitoes, anesthetized with $CO_2$, were placed on an 18-mesh stainless steel wire screen and covered by a treated cup, the screen being open to the atmosphere. The mosquitoes revived in a few minutes and were allowed to walk on the walls of the cup for about one hour. They were again anesthetized with $CO_2$ and were placed into a 5-inch circular cage of 14-mesh stainless steel and given food and water. The percent dead after 24 hours was then determined. A fresh group of mosquitoes was placed in the same cup a number of days later and the toxic effect again determined as above. This procedure was repeated at various time intervals until an appreciable drop in toxicity was noted. The following data were recorded:

ADULT MOSQUITO TEST

| Concentration of 2-chloro-5-isopropylphenyl N-chloroacetyl N-methylcarbamate (mg./sq. ft.) | Weeks (after treatment of cup) | | | | | | | | | | | |
|---|---|---|---|---|---|---|---|---|---|---|---|---|
| | 1 | 3 | 5 | 7 | 9 | 11 | 12 | 13 | 15 | 17 | 19 | 20 |
| | Percent Kill | | | | | | | | | | | |
| 50 | 100 | 100 | 100 | 100 | 90 | 100 | 100 | 100 | 100 | 100 | 100 | 70 |
| 25 | 100 | 100 | 100 | 90 | 90 | 100 | 90 | 70 | 60 | 50 | 0 | ---- |

Ideally, pesticidal compounds will be relatively harmless to mammals and yet highly toxic to undesirable pests. Acute oral toxicity to white rats is a measure of harm to mammals, such toxicity often being expressed in terms of $LD_{50}$ values. The $LD_{50}$ value assigned to a compound expresses the amount of that compound, in mg. per kg. of body weight, which will be a lethal dose to 50% of the animals tested, a high $LD_{50}$ value indicating a low (favorable) mammalian toxicity since a large dose is required. The compounds of this invention have high $LD_{50}$ values and are highly suitable for use proximate to mammals.

The compounds of the present invention may be employed alone or together in pesticidal formulations as the sole toxicants thereof. Alternatively, properties of these compounds may be modified by employing them in admixture with other toxicants such as toxaphene, DDT, Thanite, Chlordane, rotenone, pyrethrum, and the like.

These carbamates are applied according to any of the methods suitable for pesticide application, for example, as solvent solutions or in combination with solid or liquid extenders or adjuvants. Suitable solvents for the preparation of solvent solutions, which may either be used directly or after dispersion in an immiscible liquid or on a solid carrier, include pine oil, alcohols, hydrocarbon solvents such as xylene, methylated naphthalene, and isophorone, difluorodichloromethane, deodorized kerosene, cyclohexanone, methyl isobutyl ketone, and other similar organic solvents. When such a solvent solution is to be used directly, the concentration of toxicant contained therein may range from about 10% to about 90% based on the weight of the solution. Otherwise, the toxicant concentration in solution will be adjusted so that upon further dilution the desired ultimate concentration results. Amounts of toxicant ranging from about 0.1% to about 10% by weight of the diluted formulation have generally been found to be suitable. An example of an application in which a solvent solution can be used directly is where the toxicant is employed in an aerosol formulation, in which case difluorodichloromethane or a similar aerosol propellant functions, both as the solvent and as the propellant vehicle.

In many instances it will be most advantageous, for reasons of economy, facility of application, etc., to employ these pesticides in admixture with solid or nonsolvent liquid extenders. Such extenders include water and solid carrier materials, preferably those that are readily available and inexpensive, such as talc, attapulgite, natural clays, pyrophylite, diatomaceous earth, kaolin, aluminum and magnesium silicates, montmorillonite, and similar substances such as are used as carriers in the insecticide and herbicide arts. Using such solid materials as extenders, wettable powders and dusts may be formulated. In many instances, the extenders envisioned for use in this invention will themselves possess surface-active properties, in which case they may properly be termed dispersants. In other instances, such as when water is used, the extender possesses no surface-active properties of its own, and an additional material will be added to aid in the dispersion of the toxicant throughout the extender. It should be realized that while it is generally advantageous to distribute as uniformly as possible the toxic substances over surfaces to which the pesticides are applied, through the use of surface-active agents when necessary, there may be circumstances under which it is desired to omit such agents; such cases are also intended to be within the scope of this invention. Toxicant concentrations in these extended formulations may vary within wide limits; suitable concentrations for application in the field range from about 0.01% to about 20% of toxicant based on the total weight of formulation.

The aqueous dispersions contemplated herein comprise a compound of this invention, water and a surface-active dispersing agent. Ordinarily an aqueous dispersion will be made up from a concentrate comprised of the toxic compound and a surface-active agent, which concentrate will subsequently be dispersed in water to a desired concentration. The amount of toxic compound contained in a spray properly diluted for application in the field will generally range from about 0.01% to about 20% of such an aqueous dispersion. In most instances, the amount of surface-active agent used will be from about 1% to about 25% of the amount of toxicant present. Organic solvents may also be contained in the concentrate to aid in effective dispersion.

Suitable surface-active dispersing agents for use in the compositions of this invention are those disclosed in Chemistry of Insecticides, Fungicides, and Herbicides (Donald E. H. Frear, second edition (1948), pages 280–287) for use with known insecticides. They include neutral soaps of resin, alginic, and fatty acids, with alkali metals, alkyl-amines or ammonia; saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, solid dispersants such as fuller's earth, China clay, kaolin, attapulgite, and bentonite and related hydrated aluminium silicates having the property of forming a colloidal gel. Among the other surface-active dispersing agents which are useful in the compositions of this invention are the omega-substituted polyethylene glycols of relatively long chain length, particularly those in which the omega substituent is aryl, alkyl, or acyl.

Compositions of the toxic material and surface-active dispersing agent will in some instances have more than one surface-active dispersing agent for a particular type of utility. For example, the toxic material may contain surface-active clay as the sole adjuvant or clay and another surface-active dispersing agent to augment the dispersing action of the clay. Similarly, as is hereinbefore described, the toxic material may have water admixed therewith along with a surface-active dispersing agent, most often the amount of water added being sufficient to form an emulsion. All of these compositions comprising toxic compounds and surface-active dispersing agents may contain, in addition, synergists and/or adhesive or sticking agents. Moreover, the recital of specific classes of additives is not intended to limit the scope of this invention thereto, but it is to be understood that the addition of other materials of these formulations is also envisioned.

In using the toxicants of this invention for killing pests, the compounds act by contact therewith, which contact may be direct, as by spraying the insects themselves, and/ or indirect, as by contacting the habitats of the insects with the N-chloroacetyl-N-methylcarbamates.

What I claim and desire to protect by Letters Patent is:

1. A pesticidally active composition of matter represented by the structural formula

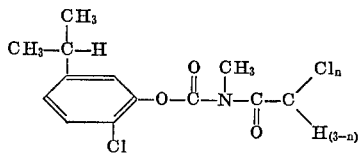

wherein $n$ represents an integer selected from the group consisting of 1, 2 and 3.

2. A composition in accordance with claim 1 wherein $n$ represents the integer 1.

3. A composition in accordance with claim 1 wherein $n$ represents the integer 2.

4. A composition in accordance with claim 1 wherein $n$ represents the integer 3.

5. A composition capable of pesticidal activity when dispersed comprising a compound of claim 1 in admixture with a surface-active dispersant.

6. A composition capable of pesticidal activity comprising a compound of claim 1 dissolved in a solvent therefor.

7. A composition capable of pesticidal activity comprising a minor amount of a compound of claim 1 and a major amount of water.

8. A composition capable of pesticidal activity comprising a minor amount of a compound of claim 1 and a major amount of a solid carrier material.

9. The method of killing insects which comprises contacting said insects with a toxic amount of a compound of claim 1.

10. The method in accordance with claim 9 in which said insects are mosquitoes.

References Cited

UNITED STATES PATENTS 3,341,401  9/1967  Kilsheimer et al. _____ 167—30

FOREIGN PATENTS 912,356  12/1962  Great Britain.
982,235  3/1965  Great Britain.

OTHER REFERENCES

Fraser et al., J. Sci. Fd. Agric. 16: 615–618, October 1965, "N-Acylation of N-Methylcarbamate Insecticides and Its Effect on Biological Activity."

Reay et al.; J. Sci. Fd. Agric. 17: 17–19, January 1966, "Evidence for Differences in Mode of Action Between Two Related Carbamate Insecticides."

LEWIS GOTTS, *Primary Examiner.*

S. K. ROSE, *Assistant Examiner.*